United States Patent [19]

Fisher

[11] Patent Number: 4,862,406
[45] Date of Patent: Aug. 29, 1989

[54] ADAPTIVE ASSOCIATIVE-PROCESSING OPTICAL COMPUTING ARCHITECTURES

[75] Inventor: Arthur D. Fisher, Alexandria, Va.

[73] Assignee: The United States of America as represented by the Secretary of the Navy, Washington, D.C.

[21] Appl. No.: 823,719

[22] Filed: Jan. 29, 1986

[51] Int. Cl.$^4$ .............................................. G06G 7/16
[52] U.S. Cl. ..................................... 364/807; 364/822
[58] Field of Search ............... 364/602, 822, 807, 841, 364/149; 369/99; 350/162.12

[56] References Cited

U.S. PATENT DOCUMENTS 4,595,994 6/1986 Vesber ................................. 364/841
4,607,344 8/1986 Athale et al. .................... 364/822 X

OTHER PUBLICATIONS

Publication, IEEE Computer Society, "Optical Adaptive Associative Computer Arthitectures", A. D. Fisher and C. L. Giles, pp. 341–344 (from Proceedings of the IEEE Compcon Spring 1985).

Primary Examiner—Jerry Smith
Assistant Examiner—Charles B. Meyer

[57] ABSTRACT

An associative processing module adapts in real time as it is exposed to associated information patterns, $(\bar{u},\bar{v})$, so, at a later time presentation of one pattern, $\bar{u}$, results in recall of the other, $\bar{v}$.

11 Claims, 3 Drawing Sheets

ADAPTIVE ASSOCIATIVE-PROCESSING OPTICAL COMPUTING ARCHITECTURES

BACKGROUND OF THE INVENTION

The present invention relates to optical associative parallel computing configurations. More specifically the present invention relates to implementation of general associative processing modules which adapt in real time as they are exposed to associated information patterns, (u,v), so at a later time presentation of one pattern, u, results in recall of the other, v.

There has been a recent resurgence of interest in associative-network parallel processing architectures, see T. Kohonen, *Self-Organization and Associative Memory* (Springer Verlag, New York, 1984); G. E. Hinton and J. A. Anderson, *Parallel Models of Associative Memory* (Laurence Erlbaum Associates, Hillsdale, NJ, 1981); A. C. Sanderson and Y. Y. Zeevi, Eds., "Special Issue on Neural and Sensory Information Processing", IEEE Trans, Syst. Man and Cybernetics, SMC-13 (1983); J. J. Hopfield, Proc. Natl. Acad., Sci., 79, p. 2554 (1982) and 81, p. 3088 (1984); and S. Grossberg, *Studies of Mind and Brain* (R. Reidel Publ. Co., Boston, 1982); for applications where the acquisition, transformation, matching/recognition, and manipulation of large amounts of information in parallel are required; for example, in pattern recognition, image understanding, robotics, expert systems, and a variety of other artificial intelligence problems. Associated information patterns u, v that are manipulated by the parallel processing architectures could encode, for example: pixel intensities from a 2-D image, strings of characters from a textual database, logical inferences, feature vectors, speech spectral samples, the state variables of a control system, antenna array signals, or the output of robot sensors. An individual associative module, or building block, which adapts in real time can potentially perform a variety of data manipulations and computations in addition to its basic associative memory function. For example, the output could be a vector v representing a spatial transformation of, or an array of features extracted from, an input image u. Nonlinearity, such as thresholding of the output v, allows yes/no decisions to be made and can force a learned pattern to be exactly recalled, rather than a superposition of learned patterns, when a distorted pattern is presented. By exploiting the ability to recall information with a partial or distorted key, u, it may be possible to implement invariances, for example to rotation, translation, or scaling of objects in an input scene. Similarly, patterns such as handwritten characters could be reduced to a standard form or symbolic code. By reconstructing an output pattern v from a partial description or related input pattern u, the associative element can "recognize" patterns with similar meaning. An associative module can also function as a novelty filter, which responds only to patterns that have not been previously encountered. By feeding portions of the output pattern back to the input, time sequences of patterns v(t) can be recalled or "semantic nets" of interrelated patterns can be reconstructed over time. Significantly greater computational abilities can be obtained by interconnecting and cascading associative modules.

There are a large number of potential implementations for an associative module, including: content-addressable digital memory, linear algebra matrix approaches, holography, and neural networks. The various associative schemes offer differing performance capabilities, but they all generally require massively parallel information processing in order to function effectively. Obtaining the required degree of parallelism has generally be a formidable block to the development and practical application of associative processing architectures. For example, a neural network capable of storing $m(\leq n)$ pairs of n element vectors requires n processing elements ("neurons") operating in parallel, with each element performing n multiplications and n additions in parallel, for a total of $n^2$ parallel multiplications and additions. A linear algebraic associative module, performing recall with the matrix-vector product of Eq. (1) below, has the same amount of intrinsic parallelism, and an efficient implementation must perform $n^2$ parallel multiplications and additions. An efficient content-addressable digital memory should simultaneously compare the current input u against all m possible matching u patterns. Conventional analog or digital approaches, employing wires, resistors and/or integrated circuits, cannot generally fully implement the required parallelism.

Optical associative modules, generally holographic, see D. Gabor, Nature, 206, p. 422 (1965) and IBM J. Res. Develop,. p. 156 (1969); A. W. Lohmann and H. W. Werlich, Phys, Lett., 25A, p. 570 (1967), and A. W. Lohmann and Ch. Thum, Opt. Com., 46, p. 74 (1983); D. J. Willshaw, O. P. Buneman and H. C. Longuet-Higgins, Nature, 222, p. 960 (1969), and D. J. Willshaw and H. C. Longuet-Higgins, Machine Intelligence, 5, p. 351, (1970); M. Nakajima, T. Morikawa, and K. Sakurai, Appl. Opt., 11, p. 362 (1972), and H. Akahori and K. Sakurai, Appl. Opt. 11, p. 413 (1972); H. Mada, Appl. Opt., 24, p. 2063 (1985); or linear-algebriac, see D. Psaltis and N. Farhat, Digest of the 13th Congress of the ICO, ICO-13, Sapporo, Japan, p. 24 (1984); D. J. Condon, M. C. Reichenbach, A. Tarasevich, and W. T. Rhodes, Postdeadline Paper, OSA Topical Meeting on Optical Computing (1985); G. Eichmann and H. J. Caulfield, Appl. Opt., 24, p. 2051 (1985): have been proposed. However, those have lacked the ability to adapt and thereby learn new associations in real time; many have been read-only memories, where associations were computed offline or created in a separated process in the form of a fixed optical mask or transparancy. Adaptivity is essential to fully exploit the capabilities of associative processing. The information required for successful performance in many applications, such as image understanding, is often too extensive and detailed to be pre-specified; adaptive learning provides a more practical means for selecting and acquiring this knowledge.

SUMMARY OF THE INVENTION

Accordingly, one object of the present invention is to provide a novel associative processing module which adapts in real-time as it is exposed to associated information patterns, $(u^k, v^k)$, so, at a later time presentation of one pattern, $u^k$, results in recall of the other, $v^k$.

Another object of the present invention is to provide a novel associative processing module which adaptively learns in real-time, even while simultaneously recalling associations.

Another object of the present invention is to provide novel associative processing modules which may be interconnected and cascaded in order to obtain sophisticated processing capabilities.

Another object of the present invention is to adaptively store associated information patterns $\bar{u}^k$ and $\bar{v}^k$ according to the controlling equation for storage $M_{n+1} = M_n + g\bar{v}^k\bar{u}^{kT} - g\overline{vu}^{kT}$, where M is a matrix and $\bar{u}$ and $\bar{v}$ are vectors.

Another object of the present invention is to adaptively recall associated information patterns $\bar{u}^k$ and $\bar{v}^k$ according to the controlling equation for recall $\bar{v} = M\bar{u}^k$.

These and other objects of the present invention can be realized with a method for adaptively storing associated information patterns $\bar{u}^k$ and $\bar{v}^k$ according to the equation $M_{n+1} = M_n + g\bar{v}^k\bar{u}^{kT} - g\overline{vu}^{kT}$; where n and k are indices denoting iteration sequence and specific vectors respectively, the overbar ⁻ signifies a vector, the double overbar = signifies a matrix, the $T$ signifies transpose and $M_n$ is a matrix; comprising the steps of: creating a first beam of light carrying information pattern $\bar{v}^k$; shining the first beam of light carrying $\bar{v}^k$ into a modulator device (e.g., Bragg cell) possessing information pattern $\bar{u}^k$ in order to create a second beam of light carrying the outer product cross-correlation $g\bar{v}^k\bar{u}^{kT}$, where g is a gain factor; shining the second beam of light carrying $g\bar{v}^k\bar{u}^{kT}$ onto a detector side in addition mode of a microchannel spatial light modulator having a detector side, a readout side, the matrix $M_n$ internally stored, an addition mode, and a subtraction mode, in order to store $M_n + g\bar{v}^k\bar{u}^{kT}$ in the light modulator; creating a third beam of light carrying information pattern $\bar{u}^k$; reflecting the third beam of light off of the readout side of the light modulator in order to create a fourth beam of light carrying information pattern $\bar{v} = M\bar{u}^k$, shining the fourth beam of light onto the other modulator (e.g., Bragg cell) possessing information pattern $\bar{u}^k$ in order to form a fifth beam of light containing the outer product cross correlation matrix $\overline{vu}^{kT}$; shining the fifth beam of light onto the detector side in subtraction mode of the light modulator possessing information pattern $M_n + g\bar{v}^k\bar{u}^{kT}$ in order to store Matrix $M_{n+1} = M_n + g\bar{v}^k\bar{u}^{kT} - g\overline{vu}^{kT}$.

A second operation includes a method for adaptively recalling associated information patterns $\bar{u}^k$ and $\bar{v}^k$ according to the equation $\bar{v} = M\bar{u}^k$, comprising the steps of: creating a first beam of light carrying information pattern $\bar{u}^k$; reflecting the first beam of light off of a readout side, possessing information pattern M, of a light modulator, having a readout side, in order to create a second beam of light carrying information pattern $\bar{v} = M\bar{u}^k$; shining the second beam of light onto a sensing means that determines information pattern $\bar{v}$.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
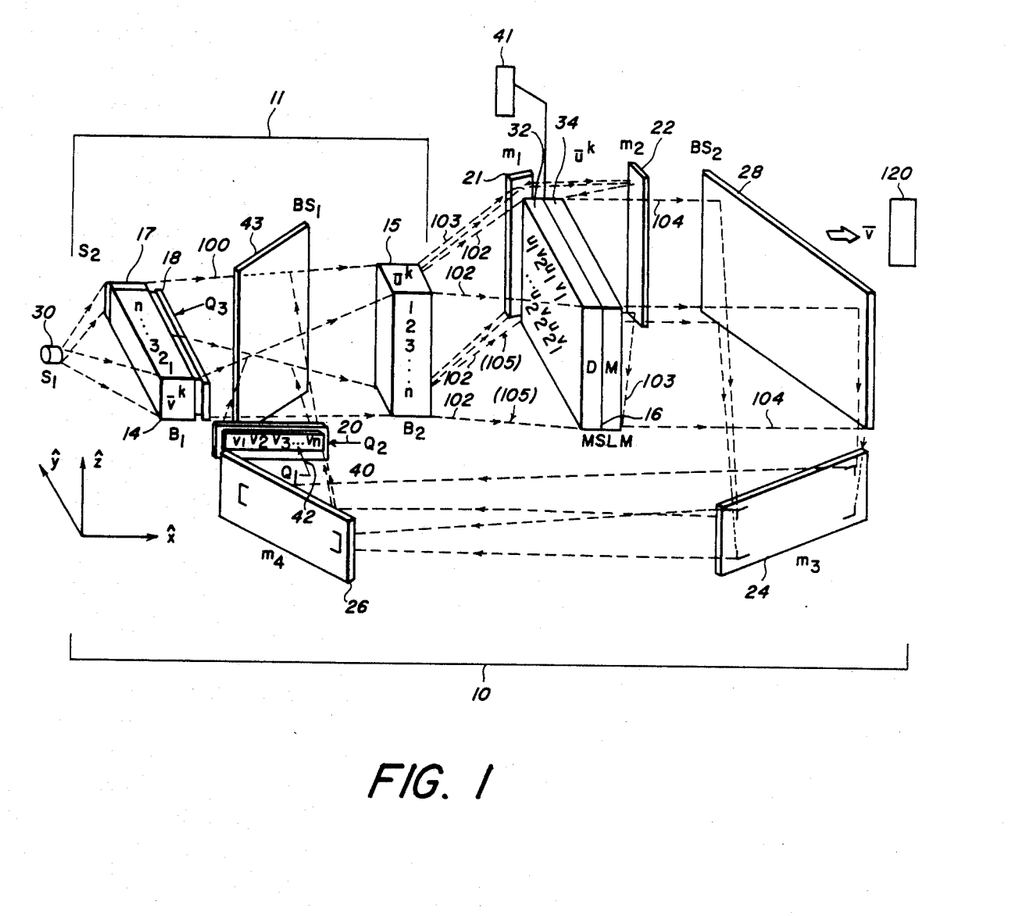
FIG. 1 is a schematic drawing of an interface adaptive associative optical module.

Referring now to the drawings, wherein like reference numeral designate identical or corresponding parts throughout the several views, and more particularly to FIG. 1 thereof, there is shown an adaptive associative optical module 10 that has the ability to implement the controlling equation for storage $M_{n+1} = M_n + g\bar{v}^k\bar{u}^{kT} - g\overline{vu}^{kT}$; where n and k are indexes denoting iteration sequence and specific vectors respectively, the overbar ⁻ signifies a vector, the double overbar = signifies a matrix, the T signifies transpose, and $M_n$ is a matrix; and has the ability to implement the controlling equation for recall $\bar{v} = M\bar{u}^k$. The module 10 is comprised of a crossed Bragg-cell outer product processor 11, (see R. A. Athale and W. C. Collins, Appl. Opt. 21, p. 2089 (1982) made up of two individual Bragg cell acousto-optical modulators 14 and 15. The crossed Bragg cell processor 11 forms the training matrices $\bar{v}^k\bar{u}^{kT}$ from the information patterns or vectors $\bar{v}^k$ and $\bar{u}^k$ that are supplied to Bragg cells 14 and 15, respectively. This matrix, $\bar{v}^k\bar{u}^{kT}$, is imaged onto the input-detector side 32 of the optically-addressed microchannel spatial light modulator (MSLM) 16 and is internally stored in the MSLM 16. The outer product cross-correlation matrix $\bar{v}^k\bar{u}^{kT}$ is formed by creating a first beam of light 100 carrying information pattern $\bar{v}^k$; shining the first beam of light carrying $\bar{v}^k$ into a Bragg cell 15 possessing information pattern $\bar{u}^k$ in order to create a second beam of light 102 carrying the outer product cross-correlation $g\bar{v}^k\bar{u}^{kT}$, where g is a gain factor; shining the second beam of light 102 carrying $g\bar{v}^k\bar{u}^{kT}$ onto a detector side 32 in addition mode of a microchannel spatial light modulator 16 having a detector side 32 a readout side 34, a matrix $M_n$ internally stored, an addition mode and a subtraction mode, in order to store $M_n + g\bar{v}^k\bar{u}^{kT}$ in the light modulator 16; creating a third beam of light 103 carrying information pattern $\bar{u}^k$; reflecting the third beam of light 103 off of the readout side 34 of the light modulator 16 in order to create a fourth beam of light 104 carrying information pattern $\bar{v} = M\bar{u}^k$ (see J. W. Goodman, A. Dias, and L. M. Woody, Opt. Lett. 2, p. 1 (1978) where $M = M_n + g\bar{v}^k\bar{u}^{kT}$; switching the light modulator 16 to a subtraction mode; shining the fourth beam of light 104 onto the bragg cell 15 possessing information pattern $\bar{u}^k$ in order to form a fifth beam of light 105 containing the outer product cross correlation matrix $\overline{vu}^{kT}$ (which follows the same path of the second beam of light 102); and shining the fifth beam of light 105 onto the detector side 32 of the light modulator 16 possessing information pattern $M_n + g\overline{v}^k\overline{u}^{kT}$ in order to store Matrix $M_{n+1} = M_n + g\overline{v}^k\overline{u}^{kT} - g\overline{vu}^{kT}$. Associative recall is then performed by creating a first beam of light 103 carrying information pattern $\overline{u}^k$; reflecting the first beam of light 103 carrying information pattern $\overline{u}^k$ off of a readout side 34 possessing information pattern M, of a light modulator 16, having a readout side 34, in order to create a second beam of light 104 carrying information pattern $v = M\overline{u}^k$; and shining the second beam of light 104 onto a sensing means 120 that determines information pattern $\overline{v}$.

In order to better understand the invention, a few basic concepts from the theory of associative memory will be reviewed.

General information patterns can often be expressed as a series of discrete values which can be written as a vector or matrix of these values, for example, the brightness of individual pixels in an image. Furthermore, linear algebraic matrix and vector manipulations provide a general means for describing many associative schemes; for example, the weighted sum over a set of input signals in a neural network can be expressed as a matrix-vector product.

Using a matrix algebra formulation, associative recall becomes the matrix-vector product:

$$v^k = Mu^k \tag{1}$$

Here $\overline{u}^k$ and $\overline{v}^k$ are a specific associated vector pair. (A single overbar denotes a vector and a double overbar denotes a matrix; the superscripts identify specific vectors). In order to store m pairs of $(\overline{u}^k, \overline{v}^k)$ associations, it is useful to define the partitioned matrices $$U = (u^1, u^2, u^3, \ldots, u^m) \tag{2a}$$

and $$V = (v^1, v^2, v^3, \ldots, v^m) \tag{2b}$$

These are n×m matrices, where n is the number of elements in $\overline{u}$ and $\overline{v}$. The associative recall of all m stored vector pairs can be summarized by the matrix-matrix product V = MU; which suggests that the association matrix M can be computed by the simple rule $$M = VU^{-1} \tag{3}$$

The existence of the inverse $U^{-1}$ demands that the capacity, i.e. number of stored vector pairs, be equal to the number of vector elements (m = n) and that the input patterns $\overline{u}^k$ be linearly independent. These conditions need not be imposed for the more general solution $$M = VU^+ \tag{4}$$

where + refers to the pseudo-inverse. See Kohonen, supra. It can be shown that Eq. (4) is the optimum associative mapping approximation in a least-squares sense. (The elements $m_{ij}$ of this M minimize the error term $(\overline{v}^k - M\overline{u}^k)^2$ over a sequence $(\overline{u}^1, \overline{v}^1), (\overline{u}^1, \overline{v}^2), (\overline{u}^2, \overline{v}^2), (\overline{u}^3, \overline{v}^3), \ldots$). When $U^{-1}$ exists, $U^+ = U^{-1}$.

When the $\overline{u}^k$s are nearly orthonormal to each other, the computation of the associative mappings can be simplified to a sum of outer-product cross-correlation matrices, $$M = VU^T = \sum_{k=1}^{m} v^k u^{kT} \tag{5}$$

Here $T$ is the matrix transpose operator, and the summation arises from using Eqs. (2) for U and V. Then in recall:

$$\sum_{g=1}^{m} (v^{iT} u^{iT}) u^k = \sum_{g=1}^{m} v^i (u^{iT} u^k) = v^k$$

Often, when $U^{-1}$ does not exist, finding M becomes an underdetermined problem for which there are more variables, $m_{ij}$, than constraints. There are then an infinite number of nonoptimal solutions similar to Eq. (4), but with additional constraints placed on the pseudo-inverse (see Eichmann et al, supra). Nonadaptive pre-computation of M is required to implement those rules and rules (3) and (4) as given. Rule (5) for M can be adaptively implemented, but restricts $\overline{u}$ to orthonormal patterns only.

So far only a static description of associative memory has been given, where Eqs. (3)-(5) are static equations of learning and Eq. (1) is a static equation of recall. The best performance is generally achieved only by associative implementations characterized by dynamic equations of learning and recall, describing dM/dt and $d\overline{v}$/dt respectively.

The associative modules of this invention are characterized by the following adaptive dynamic equation of learning $$dM/dt = g(v^k - v)u^{kT} \tag{6}$$

with the static equation (1) of recall, $\overline{v} = M\overline{u}^k$. In Eq. (6) g is an adjustable gain factor. (In application, the module outputs are intended to go to other modules and be fed back, often with nonlinearities such as thresholding, which results in overall dynamic equations of recall.)

With presentation of a sequence of $(\overline{u}^k, \overline{v}^k)$ pairs which are to be associated with each other, where each pair is held constant for a time interval $\Delta t$, Eq. (6) can be written as the difference equation, $$M_{n+1} = M_n + gv^k u^{kT} - gvu^{kT} \tag{7}$$

where $g = g'\Delta t$. Note that M is a function of the desired output $\overline{v}^k$ and the actual output, $\overline{v} = M\overline{u}^k$. This is an extension of an algorithm which first appeared in an associative network called ADALINE, see B. Widrow, in *Self-Organizing Systems* 1962, M. C. Yavits, et al., Eds. p. 435 (Spartan Books, Washington, 1962), and it can be shown that this algorithm converges to the optimum pseudo-inverse association matrix of Eq. (4) for pairs $(\overline{u}^k, \overline{v}^k)$ which are presented multiple times. See Kohonen, supra. It is not necessary that the presentations be successive, i.e., other $(\bar{u},\bar{v},)$ pairs can intervene before a given $(\bar{u}^k,\bar{v}^k)$ is seen again. Thus, this algorithm exhibits an adaptive "accumulative learning" capability, where an association builds from an initial weak outer-product autocorrelation of the form in Eq. (5) ($g\bar{v}^k\bar{u}^{kT}$) to the optimum pseudo-inverse form of Eq. (4), as a given associated vector pair is encountered multiple times. Furthermore, the negative feedback term in Eq. (7) produces a forgetting behavior which tends to prevent saturation or "overflow" of the association matrix. More specifically, if a particular stored $(\bar{u}^k,\bar{v}^k)$ pair is no longer presented to the module it tends to be displaced by newer pairs. (Mathematically, Eq. (7) can converge to the pseudo-inverse from a wide variety of initial conditions of M, and an old, no longer seen, associated pair can be treated as a modification of the initial condition for subsequent new associated pairs.)

Figure 2:
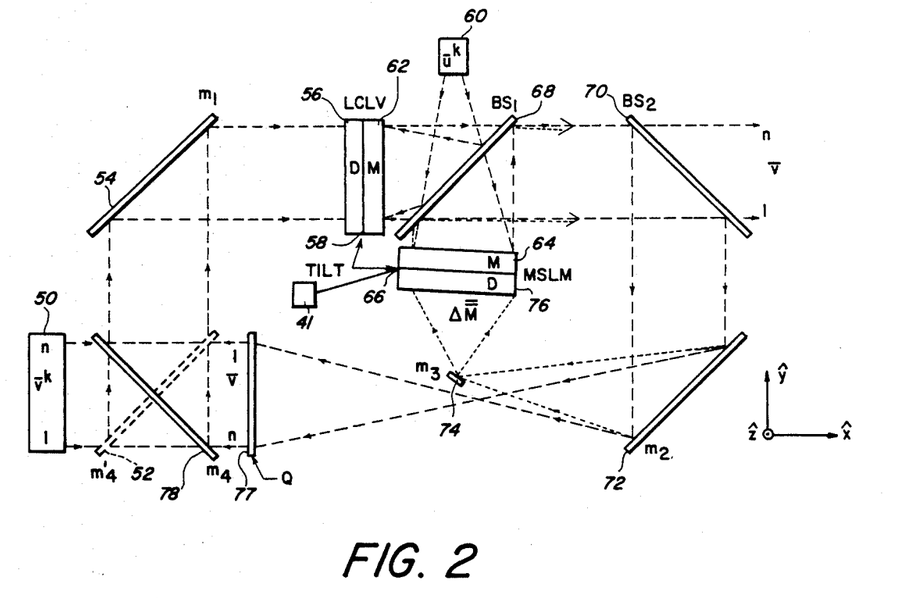
FIG. 2 is a top view schematic drawing of a cascadable adaptive associative optical module.

FIGS. 1 and 2 depict two embodiments of the invention. These configurations optically implement the adaptive dynamic learning relation of Eq. (7) and the associative recall relation of Eq. (1). The details of the imaging paths, such as cylindrical and spherical lenses, polarizers, and diffraction stops, have been omitted in order to assist the reader in conceptually understanding FIGS. 1 and 2. Placement of the lenses, polarizers and stops are obvious to one skilled in the art from the following description of the invention.

In FIG. 1, Bragg cells 14 and 15 are driven by radio-frequency signals which are modulated by vectors $\bar{v}^k$ and $\bar{u}^k$ respectively. These signals produce acoustic waves in the Bragg cells which can diffract and impress information onto light beams passed through the cells. See N. J. Berg and John N. Lee, Editors, *Acousto-optic Signal Processing* (Marcel Dekker, New York, 1983). After a time interval long enough for both acoustic signals to propagate fully into their respective Bragg cells, the light source 30 is pulsed for a brief instant, short enough to "freeze" the motion of the acoustic signals in the Bragg cells 14 and 15. This light pulse can be produced by pulsing a light emitting device such as a semiconductor laser or by placing a Bragg cell or electro-optic point modulator in front of a continuous light source. The pulse from light source 30 is collimated horizontally (along the y direction) and focused vertically (z direction) into Bragg cell 14. There, a portion of this light is modulated by $\bar{v}^k$ and diffracted. This first-order diffracted light from cell 14 is then Fourier transformed, see J. W. Goodman, *Introduction to Fourier Optics*, (McGraw-Hill, New York, 1968), (causing horizontal compression and vertical smearing of the diffracted light) into cell 15. In cell 15, this light is multiplied by $\bar{u}^k$ and diffracted. This double-diffracted light, which has now been diffracted by both cells 14 and 15, is horizontally Fourier transformed (causing imaging of cell 14) and vertically imaged (causing imaging of cell 15) onto the detector side 32 of an optical control device 16 called a spatial light modulator (SLM). The resulting light distribution on the SLM detector 32 thereby contains the two-dimensional outer-product matrix, $\bar{v}^k\bar{u}^{kT}$.

Some spatial light modulator devices, for example, a particular device called the Microchannel Spatial Light Modulator (MSLM) have the ability to internally sum and store successive images incident on their input-detector side 32. See C. Warde, A. M. Weiss, A. D. Fisher, and J. I. Thackara, "Optical information processing characteristics of the Microchannel Spatial Light Modulator" Appl. Opt. 20, p. 2066 (1981). A. R. Tanguay, Guest Ed., Special issue on Spatial Light Modulators: Critical Issues, Opt. Eng., 22 (1983). This summation can be stored for periods of up to months in the MSLM (as an internal electron charge distribution). A few modulators, such as the MSLM, can also be operated in a subtraction mode, where the image incident on the detector 32 is subtracted from the internally stored image. The effective reflectivity of the modulator side 34 can be made (with suitable polarizers) approximately proportional to the internally-stored image. Illumination incident on the modulator side 34 is multiplied by this reflectivity to produce a reflected output light distribution which is the product of the internally-stored image and the image in the readout beam incident on the modulator surface 34.

The MSLM 16 is placed in its addition mode, summing the light distribution $\bar{v}^k\bar{u}^{kT}$ incident on its detector face 32 to its internally-stored matrix $M_n$, to form a new internally-stored matrix $M_n + g\bar{v}^k\bar{u}^{kT}$, which is a portion of Eq. (7).

Part of the light pulse from source 30 passes through Bragg cell 14 without being modulated and diffracted. This undiffracted beam is then modulated by $\bar{u}^k$ and diffracted by Bragg cell 15. This $\bar{u}^k$ light distribution is now fed forward to mirrors 21 and 22 and is imaged vertically and spread out horizontally onto the modulator read-out side 34 of MSLM 16. The MSLM modulator side 34 reflects a light distribution which is the product of its internally-stored image (matrix M) and the incident light from mirror 22 (horizontally-spread vector $\bar{u}^k$). The modulated light from 34 passes to beamsplitter 28 and mirrors 24 and 26 and is horizontally imaged and vertically focused (summed) onto plane 40. This produces the matrix-vector inner-product $\bar{v} = M\bar{u}^k$ at a narrow horizontal slit 42 in plane 40. (The slit is diffraction-limited in the vertical direction. Alternatively, a diffusing screen can be employed instead of the slit in plane 40.) The product $\bar{v}$ can also be made available as the associative recall output via beamsplitters 28 and/or 43.

The open-loop outer-product to inner-product cascade described up to this point adaptively implements the cross-correlation matrix associative memory of Eq. (5). By presenting a sequence in time of vector pairs $\bar{v}^k$ and $\bar{u}^k$ to Bragg cells 14 and 15 respectively, the MSLM 16 can be operated to successively sum and store the iterative summation $M_{n+1} = M_n + g\bar{v}^k\bar{u}^{kT}$, which implements the cross-correlation, outer-product summation of Eq. (5).

The feedback path in this invention is now completed by opening shutter 20, closing shutter 18, and at the same time putting the MSLM 16 into its image subtraction mode. This is accomplished by an electronic sequencing circuit 41 which controls the voltages applied to electronic shutters 18 and 20 and the MSLM 16 (as is well known in the art). The vector $\bar{v}=M\bar{u}^k$ from the slit 42 in plane 40 is now Fourier transformed (horizontally compressed and vertically smeared) onto Bragg cell 15. The feedback vector $\bar{v}=M\bar{u}^k$ thereby assumes the role of vector $\bar{v}^k$ which had formerly come from Bragg cell 14. The diffracted light from Bragg cell 15 now produces the matrix $\overline{vu}^{kT}$ on the MSLM detector surface 32. Since the MSLM 16 is now in its subtraction mode, the operation $M_{n+1}=M_n-g\overline{vu}^{kT}$ is performed on its internally stored image.

To switch the MSLM between its addition and subtraction modes its "crystal bias" voltage $V_b$ is switched between a high level, $V_h$ for addition and a low-level, $V_L$ for subtraction where $V_h-V_L$ is generally greater than the voltage required for full contrast modulation (e.g., 1200 volts). See Warde, supra. A grid voltage greater than $V_h-V_L$ and the usual microchannel plate voltage are continuously applied to the MSLM. During addition or subtraction, the usual photo cathode voltage (−4000 volts) is also applied, but this voltage is removed at all other times to place the MSLM in its passive storage mode.

In the operation of this invention, the MSLM 16 is thus switched between its image addition and subtraction modes in synchronism with shutters 20 and 18. In this way $+g\bar{v}^k\bar{u}^{kT}$ and $-g\overline{vu}^{kT}$ are successively added into the stored image, thus implementing the iterative association matrix of Eq. (7).

A more general cascadable embodiment of this invention, where $\bar{u}^k$ and $\bar{v}^k$ can come from another module, is illustrated in FIG. 2. This figure is a top view, looking down on the module. The vector $\bar{v}^k$ 50 is reflected from mirrors 52 and 54 and imaged horizontally (y direction) and smeared vertically (z direction) onto the detector side 56 of an SLM 58. The SLM 58 is not required to have storage or subtraction capabilities, which broadens the number of candidate spatial light modulators; the use of an SLM called a liquid crystal light value (LCLV) is illustrated in FIG. 2. See W. P. Bleha, et al., "Application of the Liquid Crystal Light value to real-time optical data processing", Opt. Eng., 17, p. 371-384 (1978) (an MSLM could have been used instead).

The vector $\bar{u}^k$ 60 is imaged vertically (z direction) and smeared horizontally onto both the modulator side 62 of SLM 58 and the modulator side 64 of MSLM 66, (after reflection from and transmission through beamsplitter 68, respectively). The modulator side 62 of SLM 58 reflects an image which is the real-time product of the image incident on the modulator 62 and the image incident on the detector 56. This image from modulator 62 is thus the outer-product matrix $M=\bar{v}^k\bar{u}^{kT}$. This outer-product passes through beamsplitter 68, reflects from beamsplitter 70 and mirrors 72 and 74, and is imaged onto the detector side 76 of MSLM 66. The MSLM 66 internally adds this $\bar{v}^k\bar{u}^{kT}$ matrix to any previously-stored matrix image M, thus implementing the summation $M_{n+1}=M_n+g\bar{v}^k\bar{u}^{kT}$.

The reflected image from the modulator side 64 of MSLM 66 is the product of the incident horizontally-smeared $\bar{u}^k$ vector and the M matrix internally-stored in MSLM 66. This image from the modulator 64 relfects from beamsplitters 68 and 70 and mirror 72 and is horizontally imaged and vertically focused onto a diffraction-limited slit or a diffusing screen in plane 77, resulting in the vector $\bar{v}=M\bar{u}^k$ at plane 77. (On passing to plane 77 the $\bar{v}$ vector bypasses mirror 74, which is in a Fourier plane, due to a tilt of slightly greater than 90 degrees between SLM's 66 and 58). The associative output vector $\bar{v}$ is also available to other modules by way of beamsplitter 70.

The final subtraction term in Eq. (7) is implemented by rotating mirror 52 to position 78 and simultaneously operating MSLM 66 in its subtraction mode. (The mirrors 78 and 52 are in reality two positions of a single rotating mirror). Now vector $\bar{v}$ is imaged horizontally and smeared vertically from the slit in plane 77, via mirrors 78 and 54, to the detector side 56 of SLM 58. The beam reflected from the modulator side 62 of SLM 58 now contains the outer-product term $\overline{vu}^{kT}$, which is imaged onto the detector side 76 of SLM 66. Since SLM 66 is now in its subtraction mode, the operation $M_{n+1}=M-g\overline{vu}^{kT}$ is performed on the internally stored image. Thus, switching MSLM 66 between its addition and subtraction modes in synchronism with the rotation of mirror 78-52, implements the iterative association matrix of Eq. (7) as a stored image in MSLM 66.

In a multiple associative module architecture, the individual associative modules would spend significant amounts of time in a nonadaptive recall mode, where a stream of input $(\bar{u}^k,\bar{v}^k)$ pairs is presented to the module and the M matrix stored in the MSLM is employed to output a stream of recall vectors $\bar{v}=M\bar{u}^k$. A learning cycle is initiated on a specific $(\bar{u}^k, \bar{v}^k)$ pair at a given time, only when, for example, another part of the system (or a human "teacher") signals that a significant event has occured.

The g gain factor in Eq. (7) determines the rate of "accumulative learning" of repeated associated pairs, and g can be controlled by varying the cycle period $\Delta t$ or varying one of the power supplied (microchannel plate bias voltage) of the MSLM in FIG. 1 or 2. As g is increased the optimum psuedo-inverse association is achieved after fewer repetition (as few as three repetitions is possible.) However, very large g can cause the association matrix to become unstable nd not converge. In some cases it may be desirable to dynamically vary g based on, for example, the signal obtained by focusing the outer-product correlation matrix, $\bar{v}^k\bar{u}^{kT}$, onto a single point detector.

The associative modules of this invention can operate with coherent, incoherent, or partially coherent light. The cascadable embodiment of FIG. 2 is particularly insensitive to the illumination coherence. The embodiment of FIG. 1 works best with narrow-spectrum illumination.

The associative architectures will also include nonlinear intensity operations, such as intensity thresholding, on some of the module outputs $\bar{v}$ and feedback of parts of $\bar{v}$ to parts of $\bar{u}$. A module-output vector $\bar{v}$ can be converted to a module-input vector $\bar{u}$ by rotation through 90 degrees, which can be accomplished by passage through a dove prism. The thresholding operation can be implemented by following the module with an MSLM, which is operated so as to internally store a hard-clip thresholded version of the vector $\bar{v}$ incident on its detector face. (In hard-clip thresholding, vector elements with less intensity than the threshold level are ignored and those above threshold are stored at a preset level, regardless of their actual intensity).

The open-loop, outer-product to inner-product cascade at the heart of both FIGS. 1 and 2 are in themselves two additional embodiments of adaptive associative modules. These implement the outer-product formulation of associative memory from Eq. (5), which does not offer all the performance features of the closed-loop formulation of Eqs. (6) and (7), but is still adaptive, useful, and novel. More specifically, FIG. 1 is modified by removing components 18, 20, 24, 26, 28, 40, 43, which leaves: the crossed Bragg cells 14,16 to generate outer-product correlation matrices, followed by the SLM 16 to sum and store the association matrix, and finally optics to horizontally image and vertically focus the modulator output face 34 to create the output vector $\bar{v}$. FIG. 2 is modified by removal of components 78 and 77, which leaves the SLM 58 to generate the cross-correlation matrices, the SLM 66 to sum and store the association matrix, and optics to form the matrix-vector product output $\bar{v}$.

This invention can also optically implement a generalization of a dynamic-recall, associative formulation called the Hopfield Model, see Hopfield, supra; Psaltis et al, supra. After adaptively learning a set of $(\bar{u}^k,\bar{v}^k)$ auto-associations (i.e., $\bar{v}^k=\bar{u}^k$), the cascadable module of FIG. 2 is placed in its non-adaptive recall mode and a specific input pattern $\bar{u}^b$ is presented. The module output, $\bar{v}$, is now thresholded and this thresholded output is fed back to the module's $\bar{u}^k$ input in the place of $\bar{u}^b$. (The thresholding operation can be accomplished by another MSLM following the module output $\bar{v}$). After a few of these feedback iterations, the module output $\bar{v}$ will usually converge exactly to one of the specific previously stored patterns $\bar{u}^a$, even if the actual initial input, $\bar{u}^b$, is a distorted (similar, but not identical) version of $\bar{u}^a$. As initially formulated the Hopfield model is: nonadaptive, and based on the autocorrelation association matrix of Eq. (5). This improved implementation is adaptive and the association matrix converges to the optimum pseudo-inverse association of Eq. (4).

There are a large number of alternate implementations of the invention embodiments of FIGS. 1 and 2, which preserve their basic functionality. The MSLM in either embodiment can be replaced by another SLM which offers similar addition, subtraction, and storage modes; such as the PEMLM and possibly photo-titus or PROM spatial light modulators. See A. D. Fisher, Technical Digest of the OSA '85 Optical Computing Meeting, p. Tucl-1, (1985); and Tanguary, supra. Similarly, many SML's can potentially fill the role of SLM 58 in FIG. 2. In FIG. 1 the Bragg cell 14 can be replaced by almost any electrical-to-optical spatial light modulator (e-SLM), such as a TIR modulator, an array of light emitting diodes, a cathode-ray tube, or a liquid crystal television display. Bragg cell 15 is restricted to transmissive e-SLM's, such as the TIR device or a liquid crystal TV display. The cascadable invention embodiment of FIG. 2 can be employed as an interface embodiment by providing the $\bar{u}^k$ and/or $\bar{v}^k$ inputs directly from a e-SLM, rather than another module.

For switching between vectors $\bar{v}$ and $\bar{v}^k$, FIG. 1 illustrated a dual-shutter 18, 20 scheme and FIG. 2 illustrated a rotating mirror, 52, 78 scheme. In actuality, either technique can be employed in either embodiment; i.e., FIG. 1 can be resketched employing the rotating mirror and FIG. 2 the dual-shutter. The rotating mirror makes more efficient use of the available light by virtue of eliminating a beamsplitter. When the dual-shutter is employed it is more light efficient to extract the output vector $\bar{v}$ through the feedback beamsplitter; i.e, $\bar{v}$ in FIG. 1 would be extracted through beamsplitter 43 and a mirror would be substituted for beamsplitter 28.

A ground-glass diffusing screen can be employed instead of the slit in plane 40 of FIG. 1 or plane 77 of FIG. 2 in the $\bar{v}$ feedback path. The diffusing-screen approach may make more efficient use of the available light.

In the earlier description of FIG. 1, the undiffracted light from Bragg-cell 14 was employed to illuminate Bragg cell 15 in order to form a copy of $\bar{u}^k$ to read-out the MSLM modulator side 34. When fan-out of $\bar{v}$ to following stages requires higher light levels, a separate intense source 17 can be employed instead of the zero-order diffraction from Bragg cell 14.

Figure 3:
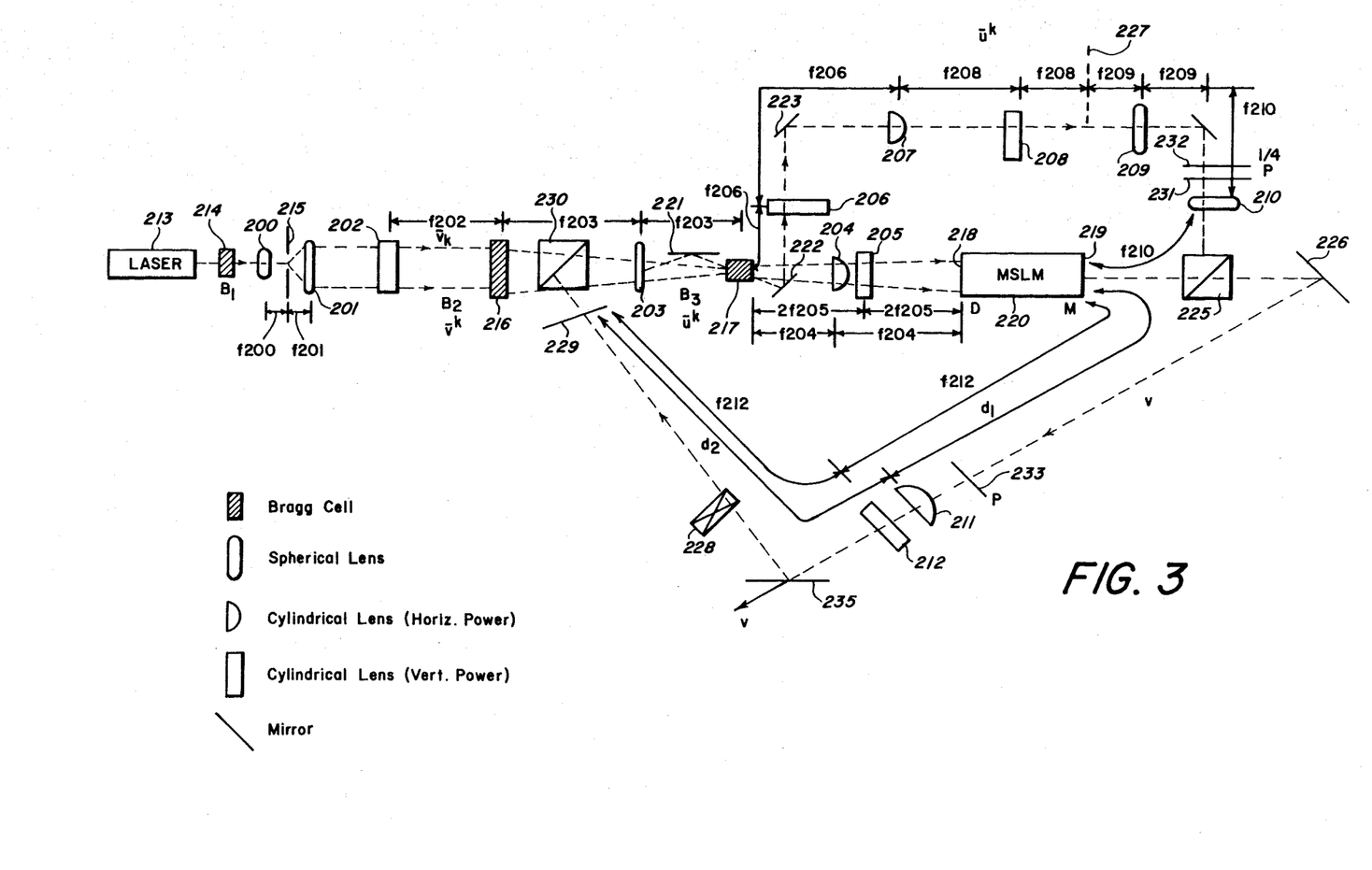
FIG. 3 is a top view schematic drawing, which elaborates by way of example on FIG. 1.

FIG. 3 is a top view of one possible optical implementation of the adaptive associative module of FIG. 1. Most lens spacings are shown, where f with a number subscript is the focal length of the lens with that number. The Bragg cell point-modulator 214 pulses the light from laser 213 in synchronism with the signals in the 1-D Bragg cell modulators 216 and 217. This pulsed light is spatially filtered by pinhole 215 and lens 200 and then collimated in two-dimensions by lens 201. Cylindrical lens 202 focuses this light beam in only the vertical direction into the Bragg cell 216, where part of this beam is modulated by $v^k$ and diffracted. The light from Bragg cell 216 is Fourier transformed by lens 203 into Bragg cell 217, resulting in a narrow vertical light distribution in Bragg cell 217. Part of this light is modulated by $\bar{u}^k$ and diffracted in Bragg cell 217. This light, which has been diffracted by both Bragg cells 216 and 217 is now imaged in the vertical direction by lens 205 and Fourier transformed in the horizontal direction by lens 204 to the detector side 218 of MSLM 220. An image of the outer-product $\bar{v}^k\bar{u}^{kT}$ is thereby formed on the detector side 2189 of MSLM 220. (The horizontal Fourier transform after lens 204 results in the horizontal image of $v\bar{v}^k$ from Bragg cell 216.)

A second path feeds the vector $\bar{u}^k$ forward to the MSLM 220 readout (modulator) side 219. The light which passes through Bragg cell 216 without being diffracted is Fourier transformed via lens 203 and mirror 221 to Bragg cell 217. This light is now modulated by $\bar{u}^k$ and diffracted in Bragg cell 217 and then passes by way mirrors 222 and 223 and lenses 206, 207, and 208 to image plane 227 in space. Lenses 206 and 208 image in the vertical direction between Bragg cell 217 and plane 227, and lens 207 performs a horizontal Fourier transform between these planes (f207=2×f206=2×f208). The resulting image in plane 227 is the vertical vector $\bar{u}^k$ with smearing in the horizontal direction. Lenses 209 and 210 image from plane 227 to the MSLM 220 readout side 219, and also demagnify and invert this image to compensate for demagnification and inversion which occur in the MSLM. The combination of lenses 206, 207, 208, 209, and 210 has been designed to preserve a flat phase front across the image incident on the MSLM 220 readout side 219.

A third path forms and feeds back the vector $\bar{v}=M\bar{u}^k$ to plane 229 via beamsplitter 225, mirrors 226 and 235, and lenses 211 and 212. The horizontally-smeared $\bar{u}^k$ vector is multiplied by the matrix M stored in the MSLM 220 and reflected from the readout side 219 of MSLM 220. Lens 211 images in the horizontal direction between the MSLM 220 readout face 219 and plane 229 with inversion and magnification ($1/d_1 + 1/d_2 = 1/f_{211}$). Lens 212 Fourier transforms in the vertical direction between these planes, resulting in the vertical summation required to form the product $\bar{v}=M\bar{u}^k$ on a diffusing screen or horizontally-oriented slit in plane 229. The beamsplitter 230 places the vector $\bar{v}$ into the outer-product generator in the place of vector $\bar{v}^k$, so that Bragg cell 217 and lenses 203, 204, and 205 can produce the outer-product $\overline{vu}^{kT}$ on the detector side 219 of MSLM 220, as described above.

The polarizers 231 and 233 and are required to make the MSLM function as an amplitude modulator. The quarter-wave plate 232 partially compensates for the depolarization effects of the other optical components. The shutter 228 blocks the $\bar{v}$ path, when the $\bar{v}^k\bar{u}^{kT}$ outer-product is desired, and the $\bar{v}^k$ path is blocked by turning off the drive signal to the Bragg cell 216. A dove prism can also be inserted in location 228 to assure proper orientation of the $\bar{v}$ vector in plane 229.

This invention provides two novel and unique optical implementations of associative processing modules. Optical implementation offers parallel processing and parallel information interconnection advantages. The recall operation is a matrix-vector product in which $n^2$ parallel multiplications are performed by a spatial light modulator and $n^2$ parallel additions are performed by lenses. The learning operation also implements $n^2$ parallel multiplications in SLM(s) in order to form an outer-product matrix and $n^2$ parallel additions or subtractions in a SLM in order to modify the association matrix. The optical implementation also offers n parallel analog communication channels on all the data paths interconnecting modules to each other and other components in a large architecture. (The associative operation itself can be veiwed as a dynamic interconnection between input vectors $\bar{u}$ and output vectors $\bar{v}$).

This invention is believed to be the first optical associative processor which can adapt and thereby learn new associations in real-time. These modules can adapt, even while simultaneously recalling old associations. This adaptive behavior is achieved by novel optical configurations which make innovative use of the specialized capabilities of optically-addressed spatial light modulators. The association matrix is dynamically formed and stored in these optical devices. These modules have a gated-learning capability, whereby adaptivity can be readily gated on or off. The modules are operated in a nonadaptive-recall mode by maintaining the MSLM in its inactive storage mode.

The embodiments of this invention in FIGS. 1 and 2 optically implement the adaptive associative formulation of Eqs. (6) and (7). These configurations offer a variety of improvements over most other forms of associative memory. These modules have an accumulative learning capability, whereby the learning of an association improves on successive exposures to a given ($\bar{u}$, $\bar{v}$) pair. With repeated presentations the association matrix M converges to the pseudo-inverse formulation of Eq. (4) which is the optimum association matrix, in a least-squares sense. These modules have an information capacity of up to n pairs of associated n element vectors, which is greater than many other forms of associative memory. The negative feedback term in the operation of these associative modules results in a forgetting behavior which tends to prevent saturation or "overflow" of the association matrix. The negative feedback also tends to compensate for aberrations of the optical system and SLM's; Eqs. (6) and (7) result in compensating distortions of the stored M matrix which tend to force the actual output $\bar{v}$ to equal the desired pattern $\bar{v}^k$. The associative formulation of Eqs. (6) and (7) is an extension of a previous electronically-implemented associative network called Adaline.

The open-loop, outer-product to inner-product cascade at the heart of both FIGS. 1 and 2 are two additional embodiments which are being claimed. These adaptively implement the correlation matrix formulation of associative memory from Eq. (5). This formulation generally requires that input patterns $\bar{u}$ be orthonormal, and it does not have the accumulative learning, optimum association, forgetting, or compensation properties of the more general embodiments in FIGS. 1 and 2.

The design of an associative building block or "module" intended to be interconnected and cascaded in larger multiple-module architectures which perform more sophisticated operations is believed to be another novel feature of this invention. Most other associative architectures have attempted to obtain greater processing ower by merely increasing the size of a single associative element.

This invention optically implements a novelty filter, (See Kohenen, supra), when the input vectors $\bar{u}^k$ are associatively stored with the null vector $\bar{v}^k=0$. The modules then produce low output levels, $\bar{v}\approx 0$, in response to a previously-stored $\bar{u}^k$, but much larger output levels when a novel, i.e. not previously stored, $\bar{u}^k$ is presented.

The invention also implements a generalization of a dynamic-recall associative formulation called the Hopfield Model, See Psaltis et al, supra; Farhat, supra. This improved implementation is adaptive, and utilizes an association matrix which converges to the optimum pseudo-inverse formulation. This implementation also offers the potential of exactly recalling an associated output pattern v from a distorted input pattern $\bar{u}$.

Obviously, numerous (additional) modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A method for adaptively storing associated information patterns $\bar{u}^k$ and $\bar{v}^k$ according to the equation $M_{n+1} = M_n + g\bar{v}^k\bar{u}^{kT} - g\bar{v}\bar{u}^{kT}$; where k and n are indexes, the overbar $^-$ signifies a vector, the double overbar $^=$ signifies a matrix, the T signifies transpose and $M_n$ is a matrix, comprising the steps of:

creating a first beam of light carrying information pattern $\bar{v}^k$;

shining the first beam of light carrying $\bar{v}^k$ into a Bragg cell possessing information pattern $\bar{u}^k$ in order to create a second beam of light carrying the outer product cross-correlation $g\bar{v}^k\bar{u}^{kT}$, where g is the gain factor;

shining the second beam of light carrying $g\bar{v}^k\bar{u}^{kT}$ onto a detector side in addition mode of an optically-addressed spatial light modulator having a detector side, a readout side, a matrix $M_n$ internally-stored therein, an addition mode and a subtraction mode, in order to store $M_n + g\bar{v}^k\bar{u}^{kT}$ in the light modulator;

creating a third beam of light carrying information pattern $\bar{u}^k$;

reflecting the third beam of light off of the readout side of the light modulator in order to create a fourth beam of light carrying information pattern $\bar{v} = M\bar{u}^k$, where $M = M_n + g\bar{v}^k\bar{u}^{kT}$;

switching the light modulator to a subtraction mode;

shining the fourth beam of light onto the Bragg cell possessing information pattern $\bar{u}^k$ in order to form a fifth beam of light containing the outer product cross correlation matrix $\bar{v}\bar{u}^{kT}$; and shining the fifth beam of light onto the detector side of the light modulator possessing information pattern $M_n + g\bar{v}^k\bar{u}^{kT}$ in order to store Matrix $M_{n+1} = M_n + g\bar{v}^k\bar{u}^{kT} - g\bar{v}\bar{u}^{kT}$.

2. A method for adaptively storing associated information patterns $\bar{u}^k$ and $\bar{v}^k$ according to the equation $M_{n+1} = M_n + g\bar{v}^k\bar{u}^{kT} - g\bar{v}\bar{u}^{kT}$, where k and n are indexes, the overbar $^-$ signifies a vector, the double overbar $^=$ signifies a matrix, the T signifies transpose and $M_n$ is a matrix, comprising the steps of:

creating a first beam of light carrying information pattern $\bar{u}^k$;

creating a second beam of light carrying information pattern $\bar{v}^k$;

shining the second beam of light carrying information pattern $\bar{v}^k$ on a detector side of a first optically-addressed spatial light modulator having a detector side and a readout side in order to multiply by $\bar{v}^k$ an image incident on the readout side.

splitting the first beam of light carrying information pattern $\bar{u}^k$ into a first and second copy of the first beam of light carrying pattern $\bar{u}^k$;

reflecting the first copy of the first beam off of the readout side of the first spatial light modulator to form a third light beam carrying the outer product cross-correlation $g\bar{v}^k\bar{u}^{kT}$, where g is a gain factor;

shining the third beam of light on a detector side in addition mode of a second optically addressed spatial light modulator having a detector side a readout side, a matrix $M_n$ internally-stored therein, an addition mode, and a subtraction mode in order to store $M_n + g\bar{v}^k\bar{u}^{kT}$ in the second modulator;

blocking the second beam of light carrying information pattern $\bar{v}^k$;

switching the second modulator to a subtraction mode;

reflecting the second copy of the first beam of light carrying information pattern $\bar{u}^k$ off of the readout side of the second modulator in order to form a fourth beam of light carrying the matrix-vector product $\bar{v} = M\bar{u}^k$;

shining the fourth beam of light carrying the information pattern $\bar{v} = M\bar{u}^k$ onto the detector side of the first spatial light modulator;

reflecting the first copy of the first beam carrying information pattern $\bar{u}^k$ off of the readout side of the first spatial light modulator to form a fifth beam of light containing the outer product cross correlation matrix $\bar{v}\bar{u}^{kT}$; and shining the fifth beam of light onto the detector side of the second light modulator possessing information pattern $M_n + g\bar{v}^k\bar{u}^{kT}$ in order to store Matrix $M_{n+1} = M_n + g\bar{v}^k\bar{u}^{kT} - g\bar{v}\bar{u}^{kT}$.

3. An apparatus for adaptively storing associated information patterns $\bar{u}^k$ and $\bar{v}^k$ according to the equation $M_{n+1} = M_n + g\bar{v}^k\bar{u}^{kT} - g\bar{v}\bar{u}^{kT}$, where k and n are indexes, the overbar $^-$ signifies a vector, the double overbar signifies a matrix, the T signifies transpose and $M_n$ is a matrix, comprising:

means for creating a first beam of light carrying information pattern $\bar{v}^k$;

a Bragg cell possessing information patterns $\bar{u}^k$;

means for shining the first beam of light into said Bragg cell in order to create a second beam of light carrying the outer product cross-correlation $g\bar{v}^k\bar{u}^{kT}$, where g is the gain factor;

a microchannel spatial light modulator having a detector side, a readout side, a matrix $M_n$ internally-stored therein, an addition mode and a subtraction mode disposed such that when the second beam of light carrying $g\bar{v}^k\bar{u}kT$ is shined onto said detector side in addition mode $M_n + g\bar{v}^k\bar{u}^{kT}$ is stored in the light modulator;

means for reflecting a third beam of light carrying information pattern $\bar{u}^k$ off of the readout side of the light modulator in order to create a fourth beam of light carrying information pattern $\bar{v} = M\bar{u}^k$, where $M = M_n + g\bar{v}^k\bar{u}^{kT}$;

means for switching the spatial light modulator to a subtraction mode;

means for shining the fourth beam of light onto the Bragg cell possessing information pattern $\bar{u}^k$ in order to form a fifth beam of light containing the outer product cross correlation matrix $\bar{v}\bar{u}^{kT}$, so when said fifth beam of light is shined onto the detector side, in subtraction mode, of the light modulator possessing information pattern $M_n + g\bar{v}^k\bar{u}^{kT}$, the Matrix $M_{n+1} = M_n + g\bar{v}^k\bar{u}^{kT} - g\bar{v}\bar{u}^{kT}$ is stored.

4. An apparatus as described in claim 3 wherein the means for creating a first beam of light is a pulsed light source and a second Bragg cell following the pulsed light source so light emitted by the pulsed light source passes through the second Bragg cell and is directed by the means for shining the first beam of light onto the first Bragg cell;

the means for reflecting the third beam of light is a first and second mirror positioned alongside of and on the readout side of the light modulator, respectively, and arranged to direct only the light emitted from the first Bragg cell which carries information pattern $\bar{u}^k$ around the light modulator to the readout side to reflect off thereof;

the means for shining the fourth beam of light is a beamsplitter that is located on the readout side of the light modulator and positioned to receive the fourth beam of light and further reflect it, a first and second mirror, said first mirror positioned to reflect the light reflected by the first beam splitter to the second mirror, said second mirror positioned on the detector side of the light modulator, and a second beamsplitter located on the detector side of thee light modulator between the first and second Bragg cells and positioned to reflect the light reflected by the second mirror or pass the light from the second Bragg cell onto the detector side of the light modulator; and the means for switching is a first and second shutter, the second shutter located between the fourth mirror and the second beam splitter and effectively blocking any light reflecting off of the fourth mirror when shut, and a control device connected to the first and second shutter to control which shutter is open.

5. An apparatus for adaptively storing associated information patterns $\bar{u}^k$ and $\bar{v}^k$ according to the equation $M_{n+1} = M_n + g\bar{v}^k\bar{u}^{kT}$, where k and n are indexes, the overbar $-$ signifies a vector, the double overbar $=$ signifies a matrix, the T signifies transpose and $M_n$ is a matrix, comprising:

means for creating a first beam of light carrying information pattern $\bar{u}^k$;

means for creating a second beam of light carrying information pattern $\bar{v}^k$;

a first optically-addressed spatial light modulator having a detector side and a readout side;

means for shining the second beam of light carrying information pattern $\bar{v}^k$ on the detector side of the first optically-addressed spatial light modulator in order to multiply by $\bar{v}^k$ an image incident on the readout side;

means for splitting the first beam of light carrying information pattern $\bar{u}^k$ into a first and second copy of the first beam of light carrying pattern $\bar{u}^k$;

means for reflecting the first copy of the first beam off of the readout side of the first spatial light modulator to form a third light beam carrying the outer product cross-correlation $g\bar{v}^k\bar{u}^{kT}$, where g is a gain factor;

a second optically addressed spatial light modulator having a detector side, a readout side, a matrix $M_n$ internally stored therein, an addition mode, and a subtraction mode;

means for shining the third beam of light on the detector side in addition mode of the second optically addressed spatial light modulator in order to store $M_n + g\bar{v}^k\bar{u}^{kT}$ in the second modulator;

means for blocking the second beam of light carrying information pattern $\bar{v}^k$;

means for switching the second modulator so the second modulator can be switched to a subtraction mode and back to an addition mode;

means for reflecting the second copy of the first beam of light carrying information pattern $\bar{u}^k$ off of the readout side of the second modulator in order to form a fourth beam of light carrying the matrix-vector product $\bar{v} = M\bar{u}^k$;

means for shining the fourth beam of light carrying the information pattern $\bar{v} = M\bar{u}^k$ onto the detector side of the first spatial light modulator so the first copy of the first beam carrying information pattern $\bar{u}^k$ is reflected by the means for reflecting the first copy of the first beam to the readout side of the first spatial light modulator to form a fifth beam of light containing the outer product cross correlation matrix $\overline{vu}^{kT}$ so when said fifth beam of light is shined onto the detector side in subtraction mode of the second light modulator possessing information pattern $M_n + g\bar{v}^k\bar{u}^{kT}$ by the means for shining the third beam of light while the blocking means is activated, the Matrix $M_{n+1} = M_n + g\bar{v}^k\bar{u}^{kT} - g\overline{vu}^{kT}$ is stored.

6. An apparatus as described in claim 5 wherein the means for creating a first beam of light is a first flashed light source and a first Bragg cell possessing information pattern $\bar{u}^k$ which is illuminated by the first flashed light source;

the means for creating a second beam of light is a second strobe light and a second Bragg cell possessing information $\bar{v}^k$ which is illuminated by the second flashed light source;

the means for shining the second beam of light is a rotating mirror having a first and second position, and a first mirror, said rotating mirror disposed in the first position to receive the second beam of light from the second Bragg cell and reflect the second beam of light to the first mirror, said first mirror positioned to receive the second beam of light reflected off the rotating mirror and to further reflect the second beam of light onto the detector side of the first optically addressed modulator;

the means for splitting the first beam of light and the means for reflecting the first copy of the first beam and the second copy of the first beam is a first beam splitter, said beam splitter positioned between the first Bragg cell and the second optically addressed modulator and alongside the first modulator so the first beam of light from the first Bragg cell strikes the first beamsplitter and is split into the first and second copy of the first beam with the first copy being formed by a portion of the first beam reflecting off of the beam splitter onto the readout side of the first light modulator to form the third beam of light, and the second copy being formed by the portion of the first beam of light that passes through the first beamsplitter and strikes the readout side of the second modulator to form the fourth beam of light;

the means for shining the third beam of light is a second beam splitter and a third and fourth mirror, said second beamsplitter disposed to reflect the third beam of light from the readout side of the first modulator onto the third mirror which in turn reflects the third beam onto the fourth mirror which further reflects the third beam onto the detector side of the second modulator.

7. An apparatus for adaptively storing associated information patterns $\bar{u}^k$ and $\bar{v}^k$ according to the equation $M_{n+1}=M_n+g\bar{v}^k\bar{u}^{kT}-g\bar{v}\bar{u}^{kT}$, where k and n are indexes, the overbar $^-$ signifies a vector, the double overbar $^=$ signifies a matrix, the T signifies transpose and $M_n$ is a matrix, comprising;

a first flashed light source;

a first Bragg cell possessing information pattern $\bar{v}^k$ which is illuminated by the first flashed light source;

a rotating mirror having a first and second position, said rotating mirror disposed in the first position to reflect light passing through the first Bragg cell;

a means for setting the rotating mirror in the first or second position connected to said rotating mirror;

a first mirror positioned to reflect light reflected off of the rotating mirror;

a first optically addressed modulator, having a detector side and a readout side, and positioned so the detector side receives light reflected off of the first mirror;

a second flashed light source;

a second Bragg cell possessing information pattern $\bar{u}^k$ which is illuminated by the second flashed light source;

a first beamsplitter situated to receive light passing through the second Bragg cell and allowing a portion of the light passing through the second Bragg cell to pass therethrough and a portion of the light passing through the second Bragg cell to be reflected onto the readout side of the first modulator;

a second light modulator having a readout side, a detector side, a subtraction mode, an addition mode and a matrix $M_n$ stored therein, and located so the readout side of the second modulator receives the portion of light from the second Bragg cell that passes through the first beamsplitter and reflects it back to the first beamsplitter;

a second beamsplitter located to reflect and to pass light from the readout side of the first light modulator and passing through the first beamsplitter, and to reflect and pass light from the readout side of the second light modulator that is reflected off of the first beamsplitter;

a second mirror located to reflect light, that has passed from the readout side of the second modulator and been reflected by the first and second beamsplitters, onto the rotating mirror so when the rotating mirror is in the second position, light reflected onto it from the second mirror will be further reflected onto the first mirror from the second beamsplitter;

a third mirror situated to reflect light from the second mirror onto the detector side of the second modulator, said light which has passed from the readout side of the first modulator through the first beamsplitter and been reflected by the second beamsplitter.

8. An apparatus for adaptively storing associated information patterns $\bar{u}^k$ and $\bar{v}^k$ according to the equation $M_{n+1}=M_n+g\bar{v}^k\bar{u}^{kT}-g\bar{v}\bar{u}^{kT}$, where k and n are indexes, the overbar signifies a vector, the double overbar signifies a matrix, the $T$ signifies transpose and $M_n$ is a matrix, comprising;

a flashed light source;

a first Bragg cell possessing information pattern $\bar{v}^k$ illuminated by the flashed light source;

a first shutter situated to block any diffracted light passing through the first Bragg cell when said first shutter is blocked;

a second Bragg cell possessing information pattern $\bar{u}^k$ situated to receive light passing through the first shutter;

A spatial light modulator having a detector mode, a readout side, an addition mode, a subtraction mode and matrix $M_n$ internally stored therein and situated so the detector side receives light that has been diffracted by both the second Bragg and the first Bragg cell;

a first mirror located alongside the light modulator to reflect light diffracted only by the second Bragg cell;

a second mirror located to reflect light from the first mirror onto the readout side of the light modulator a first beamsplitter located to receive light from the readout side of the light modulator a third mirror situated to reflect light reflected by the first beam splitter and pass this light around the side of the light modulator opposite from the first mirror;

a fourth mirror situated to reflect light from the third mirror;

a second shutter situated to block any light from the fourth mirror when it is shut;

a second beamsplitter located between the first Bragg cell and the second Bragg cell and situated to receive light passing through the second shutter or the first shutter and reflect the light or pass the light, respectively, onto the second Bragg cell;

a first switching means connected to the first and second shutters to control which shutter is open; and a second switching means for controlling whether the light modulator is in addition mode or subtraction mode.

9. An apparatus for storing associated information patterns $\bar{u}^k$ and $\bar{v}^k$ as a summation of outer product cross-correlation matrices $$M = \sum_{k=1}^{m} v^k u^{kT}$$

where $\bar{u}^k$ and $\bar{v}^k$ are associated information patterns, M is a matrix, the $T$ signifies transpose and k is an index, comprising means for creating a first beam of light carrying information pattern $\bar{v}^k$;

a Bragg cell possesing information pattern $\bar{u}^k$;

means for shining the first beam of light into said Bragg cell in order to create a second beam of light carrying the outer product cross-correlation $g\bar{v}^k\bar{u}^{kT}$, where g is the gain factor;

a microchannel spatial light modulator having a detector side, a readout side, a matrix $M_n$ internally-stored therein, an addition mode and a subtraction mode disposed such that when the second beam of light carrying $g\bar{v}^k\bar{u}^{kT}$ is shined onto said detector side in addition mode $M_n+g\bar{v}^k\bar{u}^{kT}$ is stored in the light modulator;

means for reflecting a third beam of light carrying information pattern $\bar{u}^k$ off of the readout side of the light modulator in order to create a fourth beam of light carrying information pattern $\bar{v}=M\bar{u}^k$, where $M=M_n+g\bar{v}^k\bar{u}^{kT}$.

10. An apparatus for storing associated information patterns $\bar{u}^k$ and $\bar{v}^k$ as a summation of outer product cross-correlation matrices $$M = \sum_{k=1}^{m} \bar{v}^k \bar{u}^{kT}$$

where $\bar{u}^k$ and $\bar{v}^k$ are associated information patterns, M is a matrix, the $T$ signifies transpose and k is an index, comprising means for creating a first beam of light carrying information pattern $\bar{u}^k$;
means for creating a second beam of light carrying information pattern $\bar{v}^k$;
a first optically-addressed spatial light modulator having a detector side and a readout side;
means for shining the second beam of light carrying information pattern $\bar{v}^k$ on the detector side of the first optically-addressed spatial light modulator in order to multiply by $\bar{v}^k$ an image incident on the readout side;
means for splitting the first beam of light carrying information pattern $\bar{u}^k$ into a first and second copy of the first beam of light carrying pattern $\bar{u}^k$;
means for reflecting the first copy of the first beam off of the readout side of the first spatial light modulator to form a third light beam carrying the outer product cross-correlation $g\bar{v}^k\bar{u}^{kT}$, where g is a gain factor;
a second optically addressed spatial light modulator having a detector side, a readout side, a matrix $M_n$ internally stored therein, an addition mode, and a subtraction mode;
means for shining the third beam of light on the detector side in addition mode of the second optically addressed spatial light modulator in order to store $M_n+g\bar{v}^k\bar{u}^{kT}$ in the second modulator; and
means for reflecting the second copy of the first beam of light carrying information pattern $\bar{u}^k$ off of the readout side of the second modulator in order to form a fourth beam of light carrying the matrix-vector product $\bar{v}=M\bar{u}^k$.

11. A method for associative recall, said method using a means for optically multiplying a preselected matrix M and a preselected vector $\bar{u}^T$ conformable for multiplication with said matrix M, said means for optically multiplying comprising a means for optically encoding said matrix M, and an optical input means for illuminating said means for optically encoding effective to form an optical vector $\bar{v}=M\bar{u}^T$, said method comprising, in sequence, steps for:
pre-selecting a plurality of pairs of vectors $(\bar{u}_1^k, \bar{v}_1^k), (\bar{u}_2^k, \bar{v}_2^k), \ldots, (\bar{u}_m^k, \bar{v}_m^k)$;
calculating from the values of the elements of $\bar{u}_1^k, \bar{u}_2^k, \ldots, \bar{u}_m^k$ the values of the elements of M necessary to create the identity $\bar{v}_i^k = M\bar{u}_i^{kT}$ for i equal to all integer values between 1 and m inclusive;
encoding said values of the elements of M into said means for optically encoding said matrix M effective to permit the output from said means for optically multiplying to be $\bar{v}_i^k$ for an optical signal of $\bar{u}_i^k$ input into said optical input means.

* * * * *